UNITED STATES PATENT OFFICE 2,191,299

INSECTICIDE

Lloyd E. Smith, Washington, D. C., assignor to Henry A. Wallace, as Secretary of Agriculture of the United States of America, and his successors in office No Drawing. Application October 3, 1939, Serial No. 297,727

4 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

My invention relates to the improvement in materials for destroying or checking the growth or multiplication of living organisms, whether plant or animal, which are economically injurious to man.

An object of this invention is to provide a material for use as an insecticide.

Another object of this invention is to provide a material which is relatively non-toxic to man and warm blooded animals when taken by mouth and which can be used in the place of lead arsenate and other arsenicals commonly used for destroying insects without leaving a harmful residue on fruits and vegetables.

I have found that the class of compounds known as iodoxy-benzenes and the nitro derivatives thereof are effective in killing many species of insects whether applied externally or internally; that these organic compounds may be sprayed or dusted upon delicate foliage without injuring it; that these compounds are as effective as lead arsenate and other commonly used insecticides, and that they are relatively non-toxic to warm blooded animals.

These compounds may be reduced to impalpable powder by grinding and applied to vegetation either dry as a dust or wet as a spray. The products being soluble in oils may be applied as a component of an oil emulsion spray. When applied as a spray in water it may be desirable to incorporate an effective wetting agent, such as one of the so-called sulfonated oils. For certain purposes the addition of a suitable adhesive or "sticker" may be advisable. These products may also be applied by dissolving them in an appropriate solvent such as acetone and pouring the resulting solution into water whereupon a fine colloidal precipitate is formed. This may be applied directly to the host plant or may be combined with a suitable wetting agent or adhesive and then sprayed. As examples of the toxicity of this class of compounds I have found that:

Iodoxybenzene at a concentration of 170 micrograms per square centimeter gave a 98% kill of the Southern army worm, the cross-striped cabbage worm and 100% kill of the imported cabbage worm.

p-Iodoxynitrobenzene when used at a concentration of 1 part to 400 parts of water gave 86% kill of the tobacco hornworm. At a concentration of 2 pounds per 50 gallons of water this compound gave 94% kill of the codling moth larvae, and when used at a dosage of 225 micrograms per square centimeter it gave 100% kill of the Southern army worm.

Having thus described my invention, I claim:

1. An insecticide containing as its essential active ingredient iodoxybenzene.
2. An insecticide containing as its essential active ingredient o-iodoxynitrobenzene.
3. An insecticide containing as its essential active ingredient m-iodoxynitrobenzene.
4. An insecticide containing as its essential active ingredient p-iodoxynitrobenzene.

LLOYD E. SMITH.